United States Patent
Zhao et al.

(10) Patent No.: US 10,759,987 B1
(45) Date of Patent: Sep. 1, 2020

(54) COMPOSITE TEMPERATURE RESISTANCE GEL PLUGGING AGENT, PREPARATION METHOD THEREOF AND USE THEREOF IN PROFILE CONTROL AND WATER PLUGGING OF ULTRA-DEEPTH RESERVOIR

(71) Applicants: China University of Petroleum (East China), Qingdao (CN); Northwest Oilfield Branch, China Petroleum & Chemical Co., Ltd, Urumqi, Xinjiang Uygur Autonomous Region (CN); China University of Geosciences (Beijing), Beijing (CN)

(72) Inventors: Guang Zhao, Qingdao (CN); Caili Dai, Qingdao (CN); Guangjie Hu, Qingdao (CN); Yahui Lv, Qingdao (CN); Qing You, Beijing (CN); Jianhai Wang, Beijing (CN); Ning Sun, Beijing (CN); Chenglin Gu, Beijing (CN)

(73) Assignees: China University of Petroleum (East China), Qingdao (CN); Northwest Oilfield Branch, China Petroleum & Chemical Co., Ltd, Urumqi (CN); China University of Geosciences (Beijing), Beijing (CN)

( * ) Notice: Subject to any disclaimer, the term of this patent is extended or adjusted under 35 U.S.C. 154(b) by 0 days.

(21) Appl. No.: 16/751,630

(22) Filed: Jan. 24, 2020

(30) Foreign Application Priority Data

Nov. 1, 2019 (CN) .......................... 2019 1 1066111
Jan. 17, 2020 (CN) .......................... 2020 1 0053426

(51) Int. Cl.
| | |
|---|---|
| *C09K 8/512* | (2006.01) |
| *C09K 8/516* | (2006.01) |
| *C09K 8/504* | (2006.01) |
| *C08J 3/075* | (2006.01) |
| *C08J 3/24* | (2006.01) |
| *C08K 3/04* | (2006.01) |

(52) U.S. Cl.
CPC .............. *C09K 8/512* (2013.01); *C08J 3/075* (2013.01); *C08J 3/24* (2013.01); *C08K 3/04* (2013.01); *C09K 8/5045* (2013.01); *C09K 8/516* (2013.01); *C08J 2333/26* (2013.01); *C08K 2201/011* (2013.01); *C09K 2208/10* (2013.01)

(58) Field of Classification Search
CPC .................................................. C07D 491/04
See application file for complete search history.

(56) References Cited

U.S. PATENT DOCUMENTS

2006/0234871 A1* 10/2006 Dalrymple ............. C09K 8/428
507/211

* cited by examiner

*Primary Examiner* — Alicia Bland
(74) *Attorney, Agent, or Firm* — Volpe and Koenig, P.C.

(57) ABSTRACT

A composite temperature resistance gel plugging agent, a preparation method thereof and Fuse thereof in profile control and water plugging of ultra-deep oil reservoirs.

20 Claims, 1 Drawing Sheet

Figure 1:
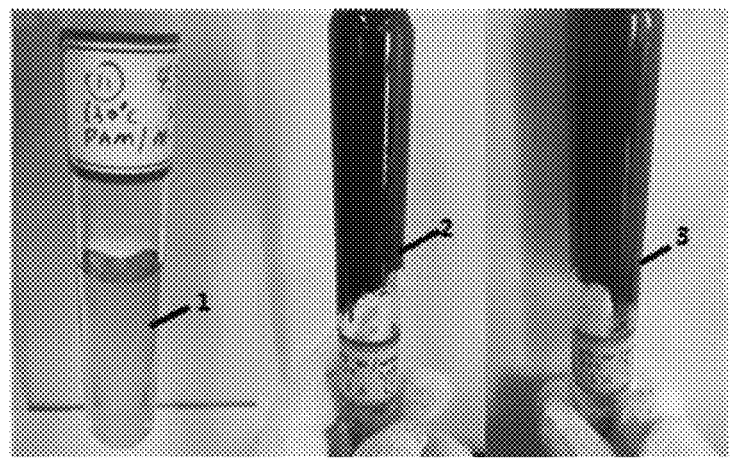

COMPOSITE TEMPERATURE RESISTANCE GEL PLUGGING AGENT, PREPARATION METHOD THEREOF AND USE THEREOF IN PROFILE CONTROL AND WATER PLUGGING OF ULTRA-DEEPTH RESERVOIR

PRIORITY CLAIM & CROSS REFERENCE

The application claims priority to Chinese Application No.201911066111.1, filed on Nov. 1, 2019, entitled "composite gel plugging agent, preparation method thereof and use thereof in profile control and water plugging of ultra-deep reservoir", and Chinese Application No.202010053426.9, filed on Jan. 17, 2020, entitled "composite temperature resistance gel plugging agent, preparation method thereof and use thereof in profile control and water plugging of ultra-deep reservoir", which is herein specifically and entirely incorporated by reference.

FIELD

The present disclosure relates to the field of oilfield chemistry, in particular to a composite temperature resistance gel plugging agent, a preparation method thereof and use thereof in profile control and water plugging of ultra-deep oil reservoirs.

BACKGROUND

With the continuous increase of the exploration degree of oil reservoirs, an oil-gas exploration area gradually changes from a middle shallow layer to a deep layer and an ultra-deep layer, and deep oil-gas resources are important fields of the future oil-gas resource development. Water injection and gas injection are important measures for the development of deep oil reservoirs, but long-term water injection or gas injection aggravates the heterogeneity of the reservoir, and cross flow is easy to occur, so that the water content of an oil well rises quickly, and the development level is reduced to some extent. The profile control and water shutoff of the ultra-deep reservoir is an important technology for improving the development effect of water injection or gas injection, and the gel type plugging agent has wide application space in the field of profile control and water shutoff by controlling the gelling time and adjusting the gelling strength. However, ultra-deep reservoir is exposed to complex severe reservoir conditions of ultra-high temperature (not less than 130° C.), ultra-high salt (not less than 20 ten thousand mg/L) and ultra-high pressure (not less than 50 MPa), and the exiting gel system has poor stability and is easy to degrade, so that the gel type plugging agent has poor profile control and water plugging effects.

CN108300440A disclosed a nano-graphite emulsion reinforced body jelly system for jelly dispersoid, a composition, a preparation method and an use thereof, which contained a polymer matrix, a resin cross-linking agent, a coagulant and nano-graphite emulsion, could form a high-strength body jelly system within 3-6 h at 85-95° C., and the obtained jelly dispersions has high temperature resistance and salt resistance. Because the system had short gelling time, the deep injection was difficult for the ultra-deep reservoir, and the process measures for profile control and water shutoff were limited.

CN103232839A disclosed a water plugging agent suitable for water plugging and profile control of a high-temperature and high-salinity oil reservoir, wherein the water plugging agent consisted of a main agent, a cross-linking agent, a stabilizing agent and the balance of water, the gelling time was 5-28 h the temperature resistance was 150° C., and the mineralization resistance was 2.0 multiplied by 104 mg/L, but the liquid preparation of the system only uses clear water, the liquid preparation of high-mineralization water cannot be met, and the field use was limited.

Therefore, the research and development of the composite temperature resistance gel plugging agent which is resistant to high temperature and high salt and can be suitable for profile control and water plugging of the ultra-deep reservoir have important significance.

SUMMARY

To overcome the defects that the gelling time of a gel system is short and the system preparation cannot meet the requirement of high salinity water preparation liquid in the exiting art, and provides a composite temperature resistance gel plugging agent, a preparation method thereof and use thereof in profile control and water plugging of an ultra-deep reservoir, wherein the composite temperature resistance gel plugging agent has high strength after being frozen, strong stability and a plugging rate of more than 90%.

In a first aspect, the present disclosure provides a composite temperature resistance gel plugging agent having a structure represented by formula (1);

formula (1)

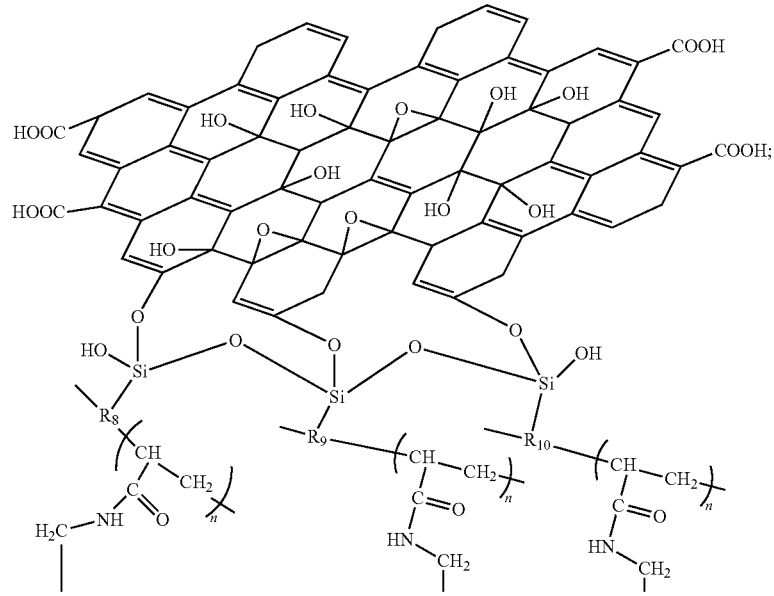

-continued

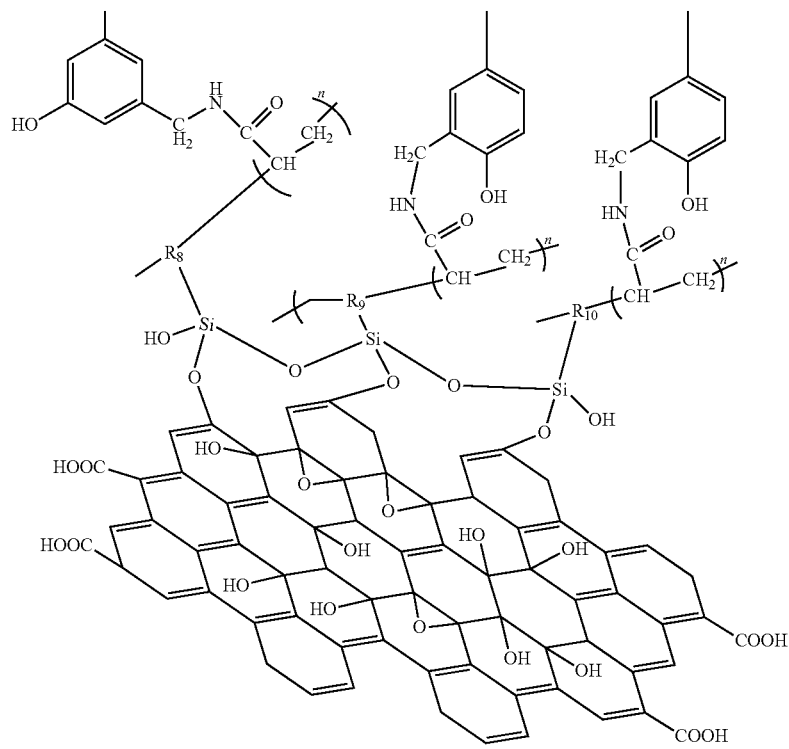

wherein $R_8$, $R_9$ and $R_{10}$ are vinyl or propenyl, respectivly; wherein n is an integer of 56000-150000.

In a second aspect, the present disclosure provides a method for preparing a composite temperature resistance gel plugging agent, including:

(F1) dissolving the modified nano graphite and polyacrylamide composite material in dispensing water to obtain a composite polymer solution;

(F2) contacting the composite polymer solution with a phenol crosslinking agent and an aldehyde crosslinking agent, and standing to obtain a composite temperature resistance gel plugging agent;

wherein the modified nano graphite and polyacrylamide composite material has a structure shown in a formula (2):

formula (2)

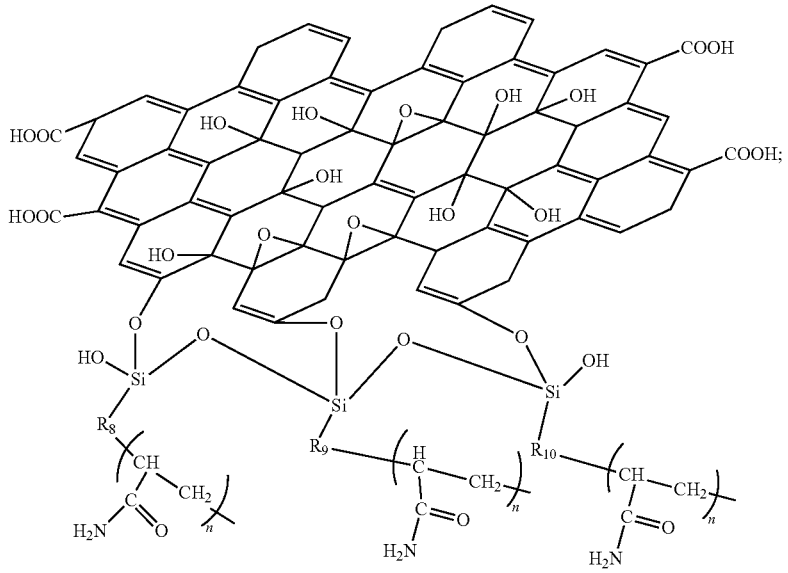

wherein $R_8$, $R_9$ and $R_{10}$ are vinyl or propenyl; n is an integer of 56000-150000;

wherein the phenolic crosslinking agent is hydroquinone and/or resorcinol; the aldehyde crosslinking agent is urotropine and/or formaldehyde.

In a third aspect, the present disclosure provides a method of a composite temperature resistance gel plugging agent being used in profile control and water plugging of ultra-deep reservoirs, wherein the composite temperature resistance gel plugging agent was described above.

Through the technical scheme, compared with the exiting art the present disclosure has the following advantages:

(1) the composite temperature resistance gel plugging agent is suitable for profile control and water plugging of ultra-deep reservoirs with reservoir temperature of 130-180° C. and mineralization degree of 20 ten thousand mg/L, the freezing time is controllable within 6-48 h, the strength after freezing is high, the stability is strong, and the plugging rate is up to more than 90%.

(2) The components of the composite temperature resistance gel plugging agent have good compatibility, the gel forming liquid is simple to prepare, and the composite gel plugging agent can be used for preparing liquid by clear water and also can be used for preparing liquid by reinjection of sewage into a high-salinity oil field, so that the problem of shortage of fresh water resources in complex and harsh construction processes such as mudflat, desert and the like is solved.

(3) The modified nano graphite used by the composite temperature resistance gel plugging agent is dispersed in water base, has the characteristics of soft texture, self-lubricating property, environmental friendliness and good stability and can strengthen the thermal stability of the gel plugging agent under the conditions of high temperature and high salinity oil reservoir.

(4) The composite temperature resistance gel plugging agent has wide raw material source and simple preparation, and is suitable for large-scale preparation operation on site.

BRIEF DESCRITION OF THE DRAWINGS

Figure 2:
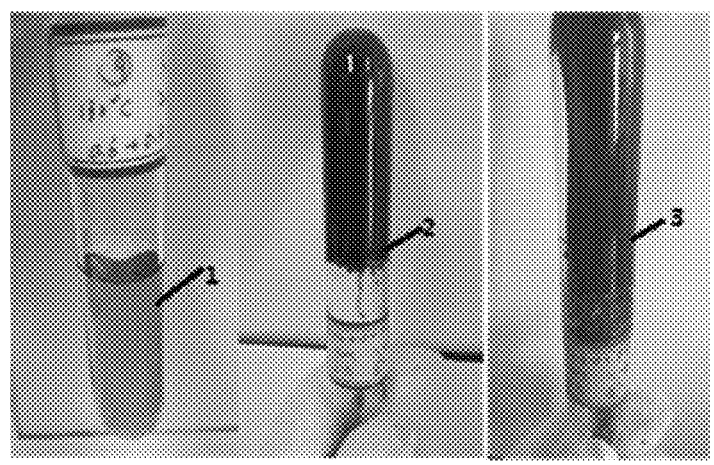

FIG. 1 is a macroscopic state of the gel forming solution, aged 12 h gel and aged 30 days gel of the composite temperature resistance gel plugging agent prepared in example 1;

FIG. 2 is a macroscopic state of the gel forming solution, aged 12 h gel and aged 30 day gel of the exiting polymer gel in comparative example 1.

DESCRIPTION OF THE REFERENCE NUMERALS

1—forming glue solution;

2—aging the jelly for 12 h;

3—aging the jelly for 30 h.

DETAILED DESCRIPTION

The terminals and any value of the ranges disclosed herein are not limited to the precise ranges or values, such ranges or values shall be comprehended as comprising the values adjacent to the ranges or values. As for numerical ranges, the endpoint values of the various ranges, the endpoint values and the individual point value of the various ranges, and the individual point values may be combined with one another to produce one or more new numerical ranges, which should be deemed have been specifically disclosed herein.

In a first aspect, the present disclosure provides a composite temperature resistance gel plugging agent having a structure shown in a formula (1);

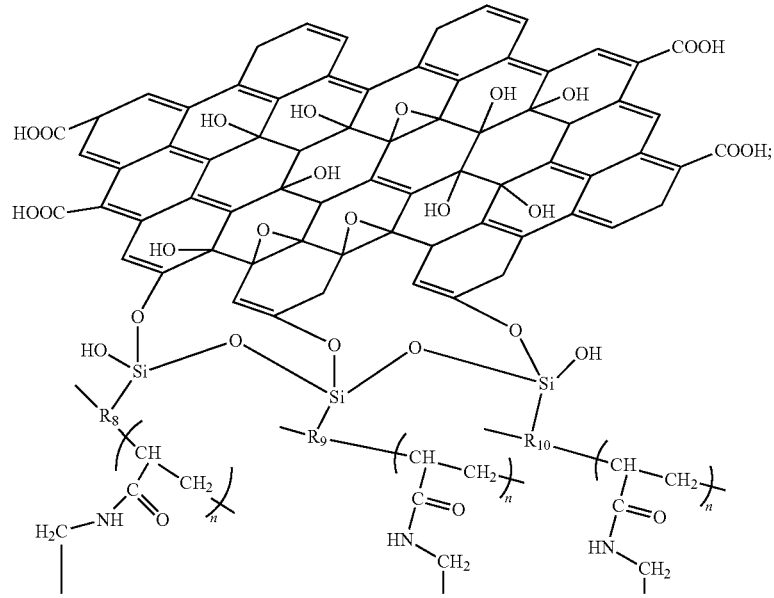

formula (1)

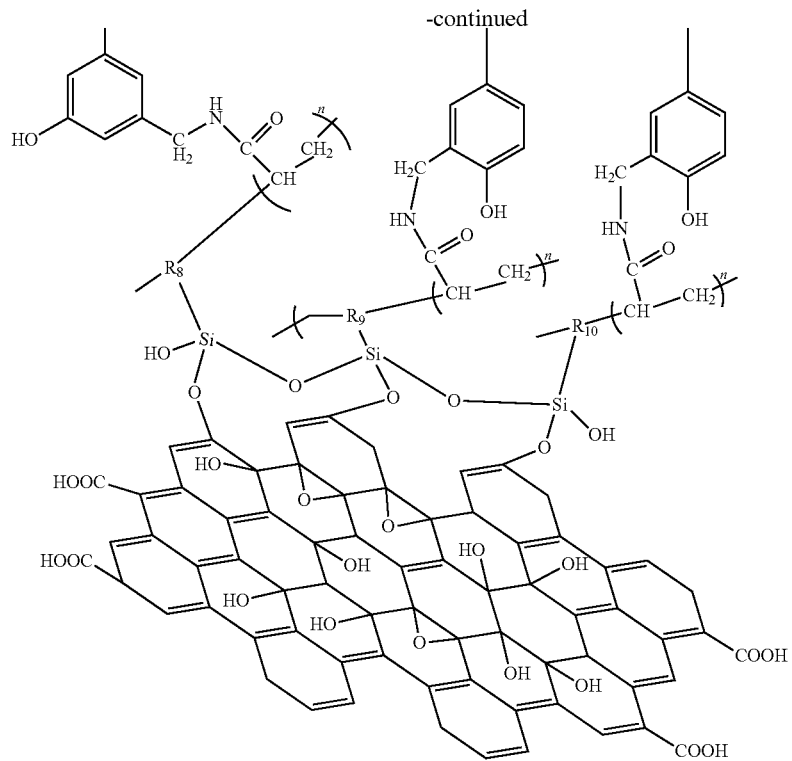

wherein $R_8$, $R_9$ and $R_{10}$ are vinyl or propenyl, respectivly;

wherein n is an integer of 5600-150000.

According to the present disclosure, $R_8$, $R_9$ and $R_{10}$ are vinyl, respectivly; n is an integer of 70000-120000.

The present disclosure provides a method for preparing a composite temperature resistance gel plugging agent, including:

(F1) dissolving the modified. nano graphite and polyacrylamide composite material in dispensing water to obtain a composite polymer solution;

(F2) contacting the composite polymer solution with a phenolic crosslinking agent and an aldehyde crosslinking agent, and standing to obtain a composite temperature resistance gel plugging agent;

wherein the modified nano graphite and polyacrylamide composite material has a structure shown in a formula (2);

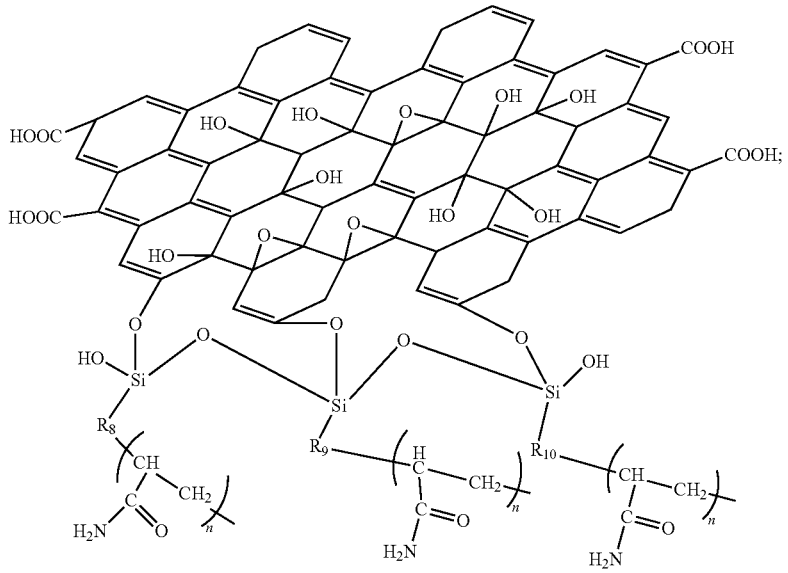

formula (2)

wherein $R_8$, $R_9$ and $R_{10}$ are vinyl or propenyl, respectivly;
wherein n is an integer of 56000-150000;
wherein the phenolic crosslinking agent is hydroquinone and/or resorcinol; the aldehyde crosslinking agent is urotropin(e) and/or formaldehyde.

According to the present disclosure, Urotropine, also known as hexamethylenetetramine, has a chemical formula of $C_6H_{12}N_4$. It is a white hygroscopic crystal powder or a colorless and glossy rhombic crystal, which is flammable, with a melting point of 263° C. If it exceeds this melting point, it will sublime and decompose, but not melt, CAS Registration No.: 100-97-0.

According to the present disclosure, it is preferable that the phenolic crosslinking agent is hydroquinone and the aldehyde crosslinking agent is urotropin(e).

According to the present disclosure, $R_8$, $R_9$ and $R_{10}$ are vinyl, respectivly; wherein m is an integer of 1600-2600, and n is an integer of 3200-5200.

According to the present disclosure, m and n are arbitrary integers within a limited interval.

According to the present disclosure, the weight average molecular weight of the modified nano graphite and polyacrylamide composite material is 400-1000 ten thousand, preferably 500-800 ten thousand, and more preferably 600-700 ten thousand.

According to the present disclosure, the hydrolysis degree of the modified nano graphite and polyacrylamide composite material is 2-10%, and preferably 3-5%.

According to the present disclosure, the mineralization degree of the dispensing water is 10-30 ten thousand mg/L, preferably 20 ten thousand mg/L, wherein the content of sodium ions is 10425-107307 mg/L, the content of calcium ions is 1000-3000 mg/L, and the content of magnesium ions is 1000-3000 mg/L.

According to the present disclosure, based on 100 parts by weight of the dispensing water, the modified nano graphite and polyacrylamide composite material is 0.3 to 0.6 parts by weight, the phenolic crosslinking agent is 0.1 to 0.5 parts by weight, the aldehyde cross-linking agent is 0.2 to 0.6 parts by weight, and in the present disclosure, the sum of the amounts of all the components is 100 parts by weight.

Preferably, based on 100 parts by weight of the prepared liquid water, the modified nano-graphite and polyacrylamide composite material is 0.4 to 0.5 parts by weight, the phenolic crosslinking agent is 0.2 to 0.4 parts by weight, the aldehyde crosslinking agent is 0.3 to 0.5 parts by weight, and in the present disclosure, the sum of the amounts of the components is 100 parts by weight.

According to the present disclosure, in step (F1), the conditions of dissolution comprise: the temperature is 15-25° C., and the time is 120-240 min; preferably, the temperature is 20-22° C. and the time is 160-200 min.

According to the present disclosure, in step (F2), the conditions of the contacting comprise: the temperature is 20-40° C., and the time is 10-90 min; preferably, the temperature is 25-35° C., and the time is 30-60 min.

According to the present disclosure, in step (F2), the conditions of the standing comprise: the temperature is 80-200° C., and the time is 6-72 h; preferably, the temperature is 130-180° C. and the time is 12-48 h.

According to the present disclosure, the method for preparing the modified nano graphite and polyacrylamide composite material comprises the following steps: in a redox initiation system, contacting the modified nano graphite with the structure shown in the formula (3) with an acrylamide monomer to perform polymerization reaction to obtain a modified nano-graphite and polyacrylamide composite material shown in the formula (2);

formula (3)

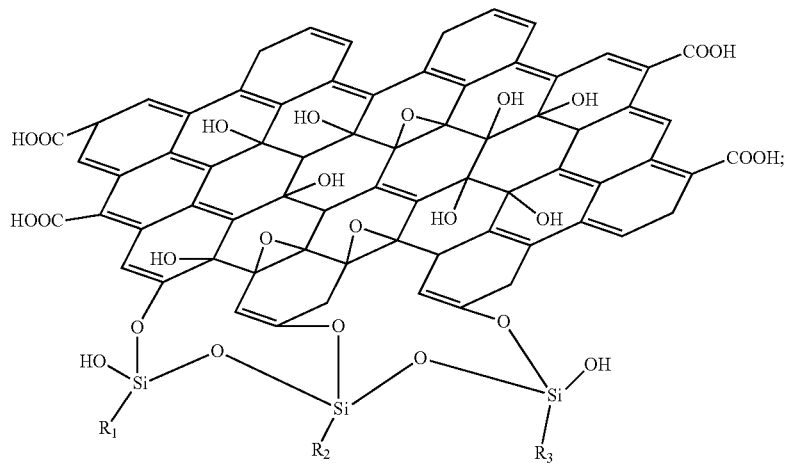

wherein, $R_1$, $R_2$ and $R_3$ are vinyl or propenyl, respectivly; preferably a vinyl.

According to the present disclosure, the redox initiation system comprises reducing agent and oxidizing agent, wherein the reducing agent is one or more selected from the group consisting of sodium bisulfite, sodium sulfite and ferrous ions; the oxidizing agent is one or more selected from the group consisting of ammonium persulfate, potassium persulfate and sodium persulfate.

According to the present disclosure, based on 100 parts by weight of deionized water, the reducing agent is 0.05 to 0.3 parts by weight, the oxidizing agent is 0.05 to 0.3 parts by weight, the modified nano graphite with the structure shown in the formula (3) is 0.01 to 0.05 parts by weight, the acrylamide monomer is 20 to 30 parts by weight, and in the present disclosure, the sum of the amounts of the components is 100 parts by weight.

Preferably, based on 100 parts by weight of deionized water, the reducing agent is 0.1 to 0.2 parts by weight, the oxidizing agent is 0.1 to 0.2 parts by weight, the modified nano graphite with the structure shown in the formula (3) is 0.02 to 0.04 parts by weight, the acrylamide monomer is 25 to 28 parts by weight, and in the present disclosure, the sum of the amounts of the components is 100 parts by weight.

According to the present disclosure, the polymerization conditions comprise: the temperature is 30-40° C., and the time is 2-5 h; preferably, the temperature is 35-40° C. and the time is 3-4 h.

According to the present disclosure, the polymerization reaction is preferably carried out under stirring conditions, wherein the stirring speed is 400-800 rpm, preferably 500-600 rpm.

According to the present disclosure, the polymerization is preferably carried out under nitrogen, with a nitrogen flow of 1-10 mL/min, preferably 5-8 mL/min.

According to the present disclosure, the method for preparing the modified nano graphite with the structure shown in the formula (3) comprises the following steps:

(a) dispersing a monomer shown in a formula (4) in deionized water to obtain a dispersion liquid;

(b) contacting the dispersion liquid with a monomer shown in a formula (5) to obtain a modified nano graphite solution;

(c) washing and drying the modified nano graphite solution to obtain a drying products, then grinding and dispersing the drying products to obtain modified nano graphite;

Preferably, in the present disclosure, when $R_4$ is vinyl, $R_5$, $R_6$ and $R_7$ are methoxy, respectivly; the monomer represented by the formula (5) is vinyltrimethoxysilane.

Preferably, in the present disclosure, when $R_4$ is vinyl, $R_5$, $R_6$ and $R_7$ are β-methoxyethoxy, respectively; the monomer represented by the formula (5) is vinyl tris (alkenylmethoxyethoxy) silane.

More preferably, $R_4$ is vinyl; $R_5$, $R_6$ and $R_7$ are ethoxy, respectivly.

According to the present disclosure, the monomer shown in the formula (5) is selected from vinyl triethoxysilane, vinyl trimethoxysilane or vinyl tris (β-methoxyethoxy) silane; more preferably vinyl triethoxysilane.

According to the present disclosure, the monomer represented by formula (4) is oxidized nano graphite, i.e. unmodified nano graphite, or bulk nano graphite, and in the present disclosure, the oxidized nano graphite is prepared by a exiting Hummers method, wherein the oxidized nano graphite has a sheet diameter of 0.5-5 μm and a thickness of 1-3 nm.

According to the disclosure, in step (a), the conditions of dispersion comprise: the stirring speed is 400-800 rpm, the ultrasonic power is 300-800 W, the temperature is 15-25° C., and the time is 1-6 h; preferably, the stirring speed is 500-600 rpm, the ultrasonic power is 500-600 W, the temperature is 20-25° C., and the time is 2-4 h.

formula (4)

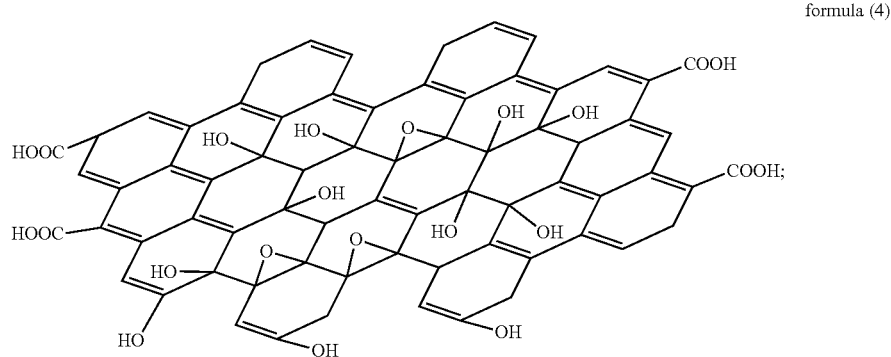

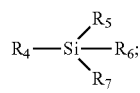

formula (5)

wherein $R_4$ is ethenyl or propenyl, respectivly;

wherein, $R_5$, $R_6$ and $R_7$ are methoxy, ethoxy or β-methoxyethoxy, respectivly, According to the present disclosure, preferably $R_4$ is vinyl; $R_5$, $R_6$ and $R_7$ are methoxy, ethoxy or β-methoxyethoxy; in the present disclosure, when $R_4$ is vinyl, when $R_5$, $R_6$ and $R_7$ are ethoxy, the structure of the monomer shown in the formula (5) is shown in a formula (6);

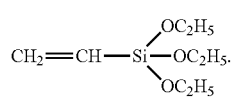

formula (6)

According to the present disclosure, in step (b), the conditions of the contacting comprise: the stirring speed is 400-800 rpm, the temperature is 60-80° C., and the time is 6-8 h; preferably, the stiffing speed is 500-600 rpm, the temperature is 65-75° C., and the time is 6.5-7.5 h.

According to the present disclosure, in step (c), the drying conditions comprise: the temperature is 35-50° C.; washing with a mixed solution of deionized water and ethanol; wherein the volume ratio of the deionized water to the ethanol in the mixed solution is 1:(1-1.5); preferably 1:1.

According to the present disclosure, the weight ratio of the monomer shown in the formula (4), the monomer shown in the formula (5) and the deionized water is (1-2.5):(0.1-0.25):100.

According to a preferred embodiment of the present disclosure, the method for preparing the modified nano graphite and polyacrylamide composite material further comprises the following steps: washing and drying a product obtained after the polymerization reaction to obtain a rubber block; and crushing and screening the rubber blocks.

In the present disclosure, a product obtained after the polymerization reaction is washed by adopting a washing solution, wherein the washing solution comprises water and ethanol; the drying is not particularly limited, and may be performed in an oven at 35-50° C. In addition, in the present disclosure, the gel mass is pulverized using a grinder, and is sieved using a sieve of 45-149 nm.

According to a preferred embodiment of the present disclosure, in particular, the method for preparing the composite temperature resistance gel plugging agent comprises: at room temperature, 15-25° C., adding the modified nano graphite and polyacrylamide composite material into the prepared liquid water, and stirring for 200 min at a stirring speed of 150 rpm until the modified nano graphite and polyacrylamide composite material is dissolved to obtain a polymer solution; adding an aldehyde crosslinking agent under the condition of stirring speed of 250 rpm, and stirring for 15 min; and then adding a phenol crosslinking agent, stirring for 15 min to obtain a gel solution, and then forming gel at 150° C. to obtain the composite temperature resistance gel plugging agent for profile control and water plugging of the ultra-deep reservoir.

According to a preferred embodiment of the present disclosure, in particular, the method for preparing the modified nano graphite and polyacrylamide composite material comprises:

At room temperature 15-25° C., adding the modified nano graphite particles into deionized water, and stirring for 40 min at a stirring speed of 500 rpm to obtain a uniformly dispersed solution; adding an acrylamide monomer while stirring, continuously introducing nitrogen for 45 min, stirring for 40 min, and controlling the reaction temperature to be 25° C.; adding a reducing agent sodium bisulfite, stirring for 5 min, adding an oxidizing agent ammonium persulfate, uniformly mixing, and reacting for 4 h; and after the reaction is finished, washing the product with a washing liquid for three times, drying the product in a 35° C. oven, taking out the gel block, crushing and. sieving the gel block to obtain the modified nano graphite and polyacrylamide composite material.

According to a preferred embodiment of the present disclosure, specifically, the method for preparing the modified nano-graphite comprises:

At room temperature 15-25° C., firstly adding oxidized nano graphite powder with the sheet diameter of 0.5-5 μm and the thickness of 1-3 nm into deionized water, stirring for 30-60 min under the condition that the stirring speed is 400-800 rpm, and performing ultrasonic dispersion for 1-6 h under the condition that the ultrasonic power is 300-800 W to obtain an oxidized nano graphite dispersion liquid; adding the monomer silane coupling agent shown in the formula (5) while stirring, and continuously stirring for 6-8 h at the water bath temperature of 60-80° C. to obtain a modified nano graphite solution; the solution obtained above was mixed in a ratio of 1:1, washing three times by using mixed liquid of deionized water and alcohol, and removing unreacted silane coupling agent; and drying the washed solution in a 35° C. oven, and grinding and dispersing to obtain the modified nano graphite particles.

According to the present disclosure, the present disclosure provides a composite temperature resistance gel plugging agent prepared by the method described above.

In a third aspect, the present disclosure provides a method of a composite temperature resistance gel plugging agent being used in profile control and water plugging of ultra-deep reservoirs, wherein the composite gel plugging agent was described above.

The present disclosure will be described in detail below by way of examples.

In the following examples and comparative examples:

The raw materials of the vinyltriethoxysilane, the vinyltrimethoxysilane, the vinyl tris (β-methoxyethoxy) silane, the acrylamide, the sodium bisulfite, the ammonium persulfate, the phenolic initiator and the aldehyde initiator are the commercial products with the trademark of Mielin corporation.

The gel strength test adopts a breakthrough vacuum degree method.

The plugging rate test adopts that the sand filling pipe of saturated oil is water-driven to 80%, the oil production, the water production and the pressure change are recorded, then the gel forming liquid of the composite gel is injected into the sand filling pipe, the aging is carried out for 3-5 days in a drying oven at the temperature of 130-180° C., then the subsequent water-driving is carried out, the oil production, the water production and the pressure change in the process are recorded, and the plugging rate is calculated.

EXAMPLE 1

This example illustrates the composite temperature resistance gel plugging agent prepared by the method of the present disclosure.

(1) Preparing modified nano graphite: at room temperature 15° C., firstly adding 0.5 g of oxidized nano graphite powder with the sheet diameter of 1 μm and the thickness of 2 nm into 20 g of deionized water, stirring for 30 min under the condition that the stirring speed was 600 rpm, and performing ultrasonic dispersion for 3 h under the condition that the ultrasonic power was 600 W to obtain an oxidized nano graphite dispersion liquid; adding 0.05 g of vinyltriethoxysilane coupling agent while stirring, and continuously stirring for 8 h at the water bath temperature of 80° C. to obtain a modified nano-graphite solution; washing the obtained solution with a mixed solution of deionized water and alcohol in a ratio of 1:1 for three times, and removing unreacted silane coupling agent; and drying the washed solution in a 35° C. oven, and grinding and dispersing. as a result, modified nano graphite particles having a plate diameter of 1 μm and a thickness of 2 nm were obtained.

(2) Preparing a modified nano graphite and polyacrylamide composite material: at room temperature 25° C., firstly adding 0.002 g of the prepared modified nano graphite powder particles into 20 g of deionized water, and stirring for 50 min to obtain a uniformly dispersed solution; adding 4 g of acrylamide monomer while stirring, continuously introducing nitrogen for 45 min, stirring for 40 min, and controlling the reaction temperature to be 40° C.; adding 0.02 g of sodium bisulfite, stirring for 5 min, and then adding 0.02 g of ammonium persulfate; after the reaction was finished, washing the product for three times by using a washing solution, drying the product in a 35° C. oven, taking out the gel block, crushing and sieving the gel block; the modified nano graphite and polyacrylamide composite material with the hydrolysis degree of 3.4% and the weight average molecular weight of 500 ten thousand was obtained, n is 70423.

(3) Raw materials: the modified nano graphite and polyacrylamide composite material has the mass fraction of 0.3%; the mass fraction of the urotropin was 0.5%; the mass fraction of the hydroquinone was 0.5%; the balance of solution was preparation water, the mass fraction of the preparation water was 98.7%, and the sum of the mass fractions of the components was 100%.

The method comprises the following steps: at room temperature 20° C., firstly adding 0.045 g of modified nano graphite and polyacrylamide composite material into 15 g of liquid preparation water with the mineralization degree of 20 ten thousand mg/L, wherein sodium ions were 71538 mg/L, calcium ions were 2000 mg/L, and magnesium ions were 2000 mg/L, stirring for 120 min until the modified nano graphite and polyacrylamide composite material was dissolved, and obtaining a modified nano graphite and polyacrylamide composite polymer solution with the mass fraction of 0.3%; adding 0.075 g of aldehyde crosslinking agent while stirring, and stirring for 10 min; then 0.075 g of phenolic crosslinking agent was added while stirring, a glue solution was obtained after stirring for 10 min, and then the glue solution was placed at 130° C. for 12 h to form glue.

The result was that the composite temperature resistance gel plugging agent A1 was obtained, and the performance was shown in Table 1 when the composite gel plugging agent was used to profile control and water plugging of ultra-deep reservoirs with the reservoir temperature of 130° C. and the mineralization of 20 ten thousand mg/L.

In addition, FIG. 1 was a macroscopic state of the gel forming solution, aged 12 h gel and aged 30 days gel of the composite temperature resistance gel plugging agent prepared in example 1; wherein, 1 represents glue solution, 2 represents aging of the jelly for 12 h, and 3 represents aging of the jelly for 30 h; as can be seen from FIG. 1: the aging time was 12 h and the aging time was 30 h, which show that the composite temperature resistance gel plugging agent has high gel strength, the strength was basically unchanged after 30 days of aging, the stability was strong under the conditions of high temperature and high salinity, and the requirement of long-term. water plugging of the ultra-deep reservoir was met.

EXAMPLE 2

This example illustrates the composite temperature resistance gel plugging agent prepared by the method of the present disclosure.

A composite temperature resistance gel plugging agent was prepared in the same method as in Example 1, except that:

(1) preparing modified nano graphite: at room temperature 25° C., firstly adding 0.2 g of oxidized nano graphite powder with the sheet diameter of 1.5 µm and the thickness of 3 nm into 20 g of deionized water, stirring for 45 min under the condition that the stirring speed was 500 rpm, and performing ultrasonic dispersion for 3 h under the condition that: the ultrasonic power was 500 W to obtain an oxidized nano graphite dispersion liquid; adding 0.02 g of vinyl triethoxysilane coupling agent while stirring, and continuously stirring for 3 h at the water bath temperature of 60° C. to obtain a modified nano graphite solution; washing the obtained solution for 3 times by using a mixed solution of deionized water and alcohol in a ratio of 1:1, and removing unreacted silane coupling agent; and drying the washed solution in an oven at 50° C., and grinding and dispersing. As a result, modified nano-graphite particles having a sheet diameter of 1.5 µm and a thickness of 3 nm were obtained.

(2) Preparing a modified nano graphite and polyacrylamide composite material: 0.03 g of the modified nano graphite powder particles prepared above was added into 100 g of deionized water; adding 25 g of acrylamide monomer while stirring; adding 0.05 g of sodium bisulfite, stirring for 5 min, and then adding 0.05 g of ammonium persulfate; the modified nano graphite and polyacrylamide composite material with the hydrolysis degree of 3% and the weight average molecular weight of 600 ten thousand was obtained, n is 84507.

(3) Raw materials: the modified nano graphite and polyacrylamide composite material had the mass fraction of 0.3%; the mass fraction of the aldehyde crosslinking agent was 0.6%; the mass fraction of the phenolic crosslinking agent was 0.6%; the balance of solution was preparation water, the mass fraction of the preparation water was 98.5%, and the sum of the mass fractions of the components was 100%.

The method comprises the following steps: at room temperature 25° C., firstly adding 0.045 g of modified nano graphite and polyacrylamide composite material into 15 g of liquid preparation water with the mineralization degree of 20 ten thousand mg/L, wherein sodium ions were 71538 mg/L, calcium ions were 2000 mg/L, and magnesium ions were 2000 mg/L, stirring for 160 min until the modified nano graphite and polyacrylamide composite material was dissolved, and obtaining a modified nano graphite and polyacrylamide composite polymer solution with the mass fraction of 0.3%; adding 0.09 g of urotropin(e) while stirring, and stirring for 10 min; then 0.09 g of hydroquinone was added while stirring, a glue solution was obtained after stirring for 10 min, and then the glue solution was formed after being placed at 150° C. for 8 h.

The result was that the composite temperature resistance gel plugging agent A2 was obtained, and the performance was shown in Table 1 when the composite gel plugging agent was used to profile control and water plugging of ultra-deep reservoirs with the reservoir temperature of 150° C. and the mineralization of 20 ten thousand mg/L.

EXAMPLE 3

This example illustrates the composite temperature resistance gel plugging agent prepared by the method of the present disclosure.

A composite temperature resistance gel plugging agent was prepared in the same method as in Example 1, except that: in step (3), in particular:

(3) raw materials: the modified nano graphite and polyacrylamide composite material has the mass fraction of 0.2%; the mass fraction of the aldehyde crosslinking agent was 0.4%; the mass fraction of the phenolic crosslinking agent was 0.4%; the balance of solution was preparation water, the mass fraction of the preparation water was 99%, and the sum of the mass fractions of the components was 100%.

The method comprises the following steps: at room temperature 25° C., firstly adding 0.03 g of modified nano graphite and polyacrylamide composite material into 15 g of liquid preparation water with the mineralization degree of 20 ten thousand mg/L, wherein sodium ions were 71538 mg/L, calcium ions were 2000 mg/L, magnesium ions were 2000 mg/L, stirring for 120 min until the modified nano graphite and polyacrylamide composite material was dissolved, and obtaining a modified nano graphite and polyacrylamide composite polymer solution with the mass fraction of 0.2%; adding 0.06 g of urotropin while stirring, and stirring for 10 min; then 0.06 g of hydroquinone was added while stirring, the mixture was stirred for 10 min to obtain a glue solution, and then the glue solution was placed at 180° C. for 6 h to form glue.

The result was that the composite temperature resistance gel plugging agent A3 was obtained, and the performance was shown in Table 1 when the composite gel plugging agent was used to profile control and water plugging of ultra-deep reservoirs with the reservoir temperature of 180° C. and the mineralization of 20 ten thousand mg/L.

EXAMPLE 4

This example illustrates the composite temperature resistance gel plugging agent prepared by the method of the present disclosure.

A composite temperature resistance gel plugging agent was prepared in the same method as in Example 1, except that:

(1) preparing modified nano graphite: at room temperature 25° C., firstly adding 0.3 g of oxidized nano graphite powder with the sheet diameter of 0.5μm and the thickness of 1 nm into 20 g of deionized water, stirring for 30 min under the condition that the stirring speed was 550 rpm, and performing ultrasonic dispersion for 3.5 h under the condition that the ultrasonic power was 550 W to obtain an oxidized nano graphite dispersion liquid; adding 0.03 g of vinyltriethoxysilane coupling agent while stirring, and continuously stirring for 7 h at the water bath temperature of 70° C. to obtain a modified nano graphite solution; washing the obtained solution for 3 times by using a mixed solution of deionized water and alcohol in a ratio of 1:1.5, and removing unreacted silane coupling agent; and drying the washed solution in an oven at 45° C., and grinding and dispersing. As a result, modified nano graphite particles having a sheet diameter of 0.5 μm and a thickness of 1 nm were obtained.

(2) Preparing a modified nano graphite and polyacrylamide composite material: firstly, adding 0.05 g of the modified nano graphite powder particles into 100 g of deionized water; adding 30 g of acrylamide monomer while stirring; adding 0.3 g of sodium bisulfite, stirring for 5 min, and then adding 0.3 g of ammonium persulfate; the modified nano graphite and polyacrylamide composite material with the hydrolysis degree of 5% and the weight average molecular weight of 800 ten thousand was obtained, n is 112676.

(3) Raw materials: the modified nano graphite and polyacrylamide composite material has the mass fraction of 0.2%; the mass fraction of the aldehyde crosslinking agent was 0.3%; the mass fraction of the phenolic crosslinking agent was 0.3%; the balance of solution was preparation water, the mass fraction of the preparation water was 99.2%, and the sum of the mass fractions of the components was 100%.

The method comprises the following steps: at room temperature 25° C., firstly adding 0.03 g of modified nano graphite and polyacrylamide composite material into 15 g of liquid preparation water with the mineralization degree of 30 ten thousand mg/L, wherein sodium ions were 107307 mg/L: calcium ions were 3000 mg/L, magnesium ions were 3000 mg/L, stirring for 240 min until the modified nano graphite and polyacrylamide composite material was dissolved, and obtaining a modified nano graphite and polyacrylamide composite polymer solution with the mass fraction of 0.2%; adding 0.045 g of urotropin while stirring, and stirring for 10 min; then 0.045 g of hydroquinone was added while stirring, the mixture was stirred for 10 min to obtain a gel forming solution, and then the gel forming solution was placed at 130° C. for 24 h to form gel.

The result was that the composite temperature resistance gel plugging agent A4 was obtained, and the performance was shown in Table 1 when the composite gel plugging agent was used to profile control and water plugging of ultra-deep reservoirs with the reservoir temperature of 130° C. and the mineralization of 30 ten thousand mg/L.

EXAMPLE 5

This example illustrates the composite temperature resistance gel plugging agent prepared by the method of the present disclosure.

A composite temperature resistance gel plugging agent was prepared in the same method as in Example 1, except that: in step (3), in particular:

(3) raw materials: the modified nano graphite and polyacrylamide composite material has the mass fraction of 0.3%; the mass fraction of the aldehyde crosslinking agent was 0.4%; the mass fraction of the phenolic crosslinking agent was 0.4%; the balance of solution was preparation water, the mass fraction of the preparation water was 98.8%, and the sum of the mass fractions of the components was 100%.

The method comprises the following steps: at room temperature 25° C., firstly adding 0.045 g of modified nano graphite and polyacrylamide composite material into 15 g of liquid preparation water with the mineralization degree of 30 ten thousand mg/L, wherein sodium ions were 107307 mg L, calcium ions were 3000 mg/L, magnesium ions were 3000 mg/L, stirring for 180 min until the modified nano graphite and polyacrylamide composite material was dissolved, and obtaining a modified nano graphite and polyacrylamide composite polymer solution with the mass fraction of 0.3%; adding 0.08 g of urotropin while stirring, and stirring for 10 min; then 0.08 g of hydroquinone was added while stirring, the mixture was stirred for 10 min to obtain a glue solution, and then the glue solution was placed at 150° C. for 8 h to form glue.

The result was that the composite temperature resistance gel plugging agent A5 was obtained, and the performance was shown in Table 1 when the composite gel plugging agent was used to profile control and water plugging of ultra-deep reservoirs with the reservoir temperature of 150° C. and the mineralization of 30 ten thousand mg./L.

EXAMPLE 6

This example illustrates the composite temperature resistance gel plugging agent prepared by the method of the present disclosure.

A composite temperature resistance gel plugging agent was prepared in the same method as in Example 1, except that: in step (3), in particular:

(3) raw materials: the modified nano graphite and polyacrylamide composite material had the mass fraction of 0.3%; the mass fraction of the aldehyde crosslinking agent was 0.3%; the mass fraction of the phenolic crosslinking agent was 0.3%; the balance of solution was preparation water, the mass fraction of the preparation water was 99.1%, and the sum of the mass fractions of the components was 100%.

The method comprises the following steps: at room temperature 25° C., firstly adding 0.045 g of modified nano graphite and polyacrylamide composite material into 15 g of liquid preparation water with the mineralization degree of 30 ten thousand mg/L, wherein sodium ions were 10737 mg/L, calcium ions were 3000 mg/L, magnesium ions were 3000 mg/L, stirring for 120 min until the modified nano graphite and polyacrylamide composite material was dissolved, and obtaining a modified nano graphite and polyacrylamide composite polymer solution with the mass fraction of 0.3%;

adding 0.045 g of urotropin while stirring, and stirring for 10 min; then 0.045 g of hydroquinone was added while stirring, the mixture was stirred for 10 min to obtain a glue solution, and then the glue solution was placed at 180° C. for 6 h to form glue.

The result was that the composite temperature resistance gel plugging agent A6 was obtained, and the performance was shown in Table 1 when the composite gel plugging agent was used to profile control and water plugging of ultra-deep reservoirs with the reservoir temperature of 180° C. and the mineralization of 30 ten thousand mg/L.

EXAMPLE 7

This example illustrates the composite temperature resistance gel plugging agent prepared by the method of the present disclosure.

A composite temperature resistance gel plugging agent was prepared in the same method as in Example 1, except that: in step (3), in particular:

(3) raw materials: the modified nano graphite and polyacrylamide composite material had the mass fraction of 0.6%; the mass fraction of the aldehyde crosslinking agent was 0.2%; the mass fraction of the phenolic crosslinking agent was 0.3%; the balance of solution was preparation water, the mass fraction of the preparation water was 99.0%, and the sum of the mass fractions of the components was 100%.

The method comprises the following steps: at room temperature 25° C., firstly adding 0.09 g of modified nano graphite and polyacrylamide composite material into 15 g of liquid preparation water with the mineralization degree of 20 ten thousand mg/L, wherein sodium ions were 71538 mg/L, calcium ions were 2000 mg/L, magnesium ions were 2000 mg/L, stirring for 120 min until the modified nano graphite and polyacrylamide composite material was dissolved, and obtaining a modified nano graphite and polyacrylamide composite polymer solution with the mass fraction of 0.6%; adding 0.03 g of urotropin while stirring, and stirring for 10 min; then 0.045 g of hydroquinone was added while stirring, the mixture was stirred for 10 min to obtain a glue solution, and then the glue solution was placed at 130° C. for 10 h to form glue.

The result was that the composite temperature resistance gel plugging agent A7 was obtained, and the performance was shown in Table 1 when the composite gel plugging agent was applied to profile control and water plugging of ultra-deep reservoirs with the reservoir temperature of 130° C. and the mineralization of 20 ten thousand mg/L.

EXAMPLE 8

This example illustrates the composite temperature resistance gel plugging agent prepared by the method of the present disclosure.

A composite temperature resistance gel plugging agent was prepared in the same method as in Example 1, except that: in step (3), in particular:

(3) raw materials: the modified nano graphite and polyacrylamide composite material had the mass fraction of 0.3%; the mass fraction of the aldehyde crosslinking agent was 0.3%; the mass fraction of the phenolic crosslinking agent was 0.2%; the balance of solution was preparation water, the mass fraction of the preparation water was 99.2%, and the sum of the mass fractions of the components was 100%.

The method comprises the following steps: at room temperature 25° C., firstly adding 0.045 g of modified nano graphite and polyacrylamide composite material into 15 g of liquid preparation water with the mineralization degree of 30 ten thousand mg/L, wherein sodium ions were 10737 mg/L, calcium ions were 3000 mg/L, magnesium ions were 3000 mg/L, stirring for 60 min until the modified nano graphite and polyacrylamide composite material was dissolved, and obtaining a modified nano graphite and polyacrylamide composite polymer solution with the mass fraction of 0.3%; adding 0.03 g of urotropin while stirring, and stirring for 10 min; then adding 0.045 g hydroquinone while stirring, stirring for 10 min to obtain a glue solution, and then standing at 150° C. for 8 h to form the glue.

The result was that the composite temperature resistance gel plugging agent A8 was obtained, and the performance was shown in Table 1 when the composite gel plugging agent was applied to profile control and water plugging of ultra-deep reservoirs with the reservoir temperature of 150° C. and the mineralization of 30 ten thousand mg/L.

EXAMPLE 9

This example illustrates the composite temperature resistance gel plugging agent prepared by the method of the present disclosure.

A composite temperature resistance gel plugging agent was prepared in the same method as in Example 1, except that: in step (3), in particular:

(3) raw materials: the modified nano graphite and polyacrylamide composite material had the mass fraction of 0.4%; the mass fraction of the aldehyde crosslinking agent was 0.2%; the mass fraction of the phenolic crosslinking agent was 0.2%; the balance of solution was preparation water, the mass fraction of the preparation water was 99.2%, and the sum of the mass fractions of the components was 100%.

The method comprises the following steps: at room temperature 25° C., firstly adding 0.06 g of modified nano graphite and polyacrylamide composite material into 15 g of liquid preparation water with the mineralization degree of 30 ten thousand mg/L, whereinsodium ions were 10737 mg/L, calcium ions were 3000 mg/L, magnesium ions were 3000 mg/L, stirring for 120 min until the modified nano graphite and polyacrylamide composite material was dissolved, and obtaining a modified nano graphite and polyacrylamide composite polymer solution with the mass fraction of 0.4%; adding 0.03 g of urotropin while stirring, and stirring for 10 min; then 0.03 g of hydroquinone was added while stirring, the mixture was stirred for 10 min to obtain a glue solution, and then the glue solution was placed at 140° C. for 12 h to form glue.

The result was that the composite temperature resistance gel plugging agent A9 was obtained, and the performance was shown in Table 1 when the composite gel plugging agent was used to profile control and water plugging of ultra-deep reservoirs with the reservoir temperature of 140° C. and the mineralization of 30 ten thousand mg/L.

COMPARATIVE EXAMPLE 1

A polymer jelly was prepared in the same method as in Example 1, except that: the modified nanographite and polyacrylamide composite obtained in step (2) of example 1 was replaced with polyacrylamide having a hydrolysis degree of 4% and the same weight average molecular weight of 500 ten thousand g/mol.

The result shows that the gel system DA1 was obtained, the gelling time was 12 h, the stabilization period was only 10 days, the strength retention rate was 23%, and the core plugging rate was 32%. The details were shown in Table 1.

In addition, FIG. 2 was a macroscopic state of the gel forming solution, aged 12 h gel and aged 30 day gel of the exiting polymer gel in comparative example 1. Wherein 1 represents glue solution, 2 represents aging of the jelly for 12 h, and 3 represents aging of the jelly for 30 h; as could be seen from FIG. 2: the common polymer gel was seriously dehydrated after being aged for 30 days under the conditions of high temperature and high salinity, which indicated that the stability was poor, and the requirement of long-term water shutoff of the ultra-deep reservoir was difficult to meet.

COMPARATIVE EXAMPLE 2

A polymer jelly was prepared in the same method as in Example 3, except that: polyacrylamide with the same weight average molecular weight of 500 ten thousand g/mol and a degree of hydrolysis of 4% was used instead of the modified nanographite and polyacrylamide composite material in example 3.

The result shows that the gel system DA2 was obtained, the gelling time was 6 h, time stabilization period was only 5 days, the strength retention rate was 15%, and the core plugging rate was 26%. The details were shown in Table 1.

COMPARATIVE EXAMPLE 3

A polymer jelly was prepared in the same method as in example 5, except that: polyacrylamide with the same weight average molecular weight of 500 ten thousand g/mol and a degree of hydrolysis of 4% was used instead of the modified nanographite and polyacrylamide composite material of example 5.

The result shows that the gel system DA3 was obtained, the gelling time was 8 h, the stabilization period was only 8 days, the strength retention rate was 20%, and the core plugging rate was 30%. The details are shown in Table 1.

COMPARATIVE EXAMPLE 4

A polymer jelly was prepared in the same method as in example 6, except that: polyacrylamide with the same weight average molecular weight of 500 ten thousand g/mol and a degree of hydrolysis of 4% was used instead of the modified nanographite and polyacrylamide composite material of example 6.

The result shows that the gel system DA4 was obtained, the gelling time was 8 h, the stabilization period was only 10 days, the strength retention rate was 28%, and the core plugging rate was 30%. The details are shown in Table 1.

TABLE 1

| Number | Gel forming time | Gel forming strength KPa | Stationary phase | Strength retention % | Plugging rate % |
|---|---|---|---|---|---|
| A1 | 17 | 35 | 90 | 95 | 93 |
| A2 | 8 | 47 | 90 | 94 | 91 |
| A3 | 6 | 38 | 90 | 91 | 94 |
| A4 | 24 | 30 | 90 | 95 | 93 |
| A5 | 8 | 41 | 90 | 93 | 93 |
| A6 | 6 | 45 | 90 | 97 | 91 |
| A7 | 48 | 37 | 90 | 90 | 90 |
| A8 | 36 | 34 | 90 | 93 | 95 |
| A9 | 16 | 36 | 90 | 91 | 92 |
| DA1 | 17 | 41 | 10 | 23 | 37 |
| DA2 | 6 | 54 | 5 | 15 | 26 |
| DA3 | 8 | 48 | 8 | 20 | 30 |
| DA4 | 24 | 36 | 10 | 28 | 34 |

The results in the table 1 show that the composite temperature resistance gel plugging agent prepared by the method is suitable for profile control and water plugging of ultra-deep reservoirs with the reservoir temperature of 130° C. and the mineralization of 30 ten thousand mg/L, the freezing time is controllable, the strength after freezing is high, the stability is strong, and the plugging rate is up to more than 90%.

In addition, it should be noted that the most significant differences between the synthetic and polymer gels are in stability, which is reflected in stability period, strength retention and plugging rate. Although both of them have high initial gel strength in table 1, the stability of the composite gel is much higher than that of the common polymer gel, which shows that the composite gel has high strength after freezing and has good stability and plugging rate.

The above content describes in detail the preferred embodiments of the present, but the present is not limited thereto. A variety of simple modifications can be made to the technical solutions of the present within the scope of the technical concept of the present, including a combination of individual technical features in any other suitable manner, such simple modifications and combinations thereof shall also be regarded as the content disclosed by the present, each of them falls into the protection scope of the present.

The invention claimed is:

1. A composite temperature resistance gel plugging agent having a structure shown in formula (1);

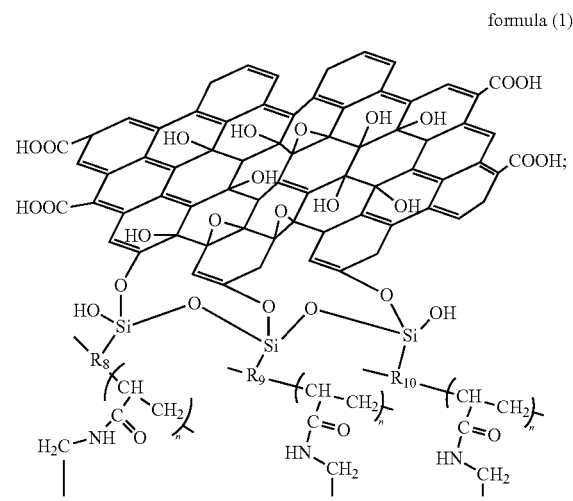

formula (1)

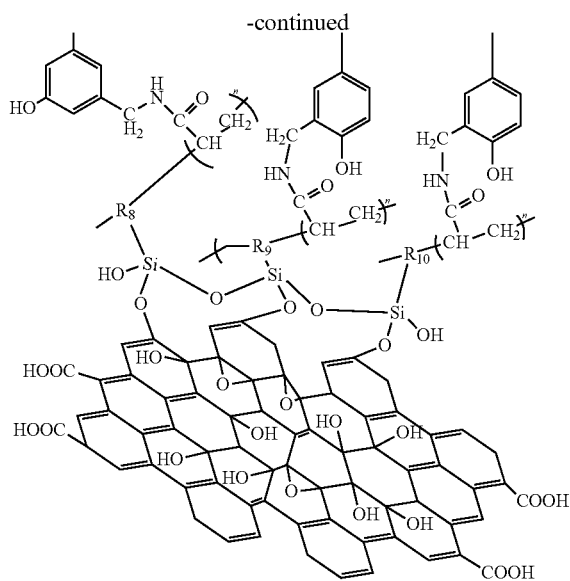

wherein $R_8$, $R_9$ and $R_{10}$ are derived from vinyl or propenyl;

wherein n is an integer of 56000-150000.

2. The composite temperature resistance gel plugging agent of claim 1, wherein $R_8$, $R_9$ and $R_{10}$ are derived from vinyl;

wherein n is an integer of 70000-120000.

3. A method for preparing a composite temperature resistance gel plugging agent, including:
(F1) dissolving modified nano graphite and polyacrylamide composite material in dispensing water to obtain a composite polymer solution;
(F2) contacting the composite polymer solution with phenolic crosslinking agent and aldehyde crosslinking agent, and standing to obtain a composite temperature resistance gel plugging agent;
wherein the modified nano graphite and polyacrylamide composite material has a structure shown in a formula (2);

wherein $R_8$, $R_9$ and $R_{10}$ are derived from vinyl or propenyl;

wherein n is an integer of 56000-150000;

wherein the phenolic crosslinking agent is hydroquinone and/or resorcinol; the aldehyde crosslinking agent is urotropin and/or formaldehyde.

4. The method of claim 3, wherein $R_8$, $R_9$, and $R_{10}$ are derived from vinyl; wherein n is an integer of 70000-120000.

5. The method of claim 3, wherein the weight average molecular weight of the modified nano graphite and polyacrylamide composite material is $400\text{-}1000\times10^4$.

6. The method of claim 3, wherein the degree of mineralization of the dispensing water is $10\text{-}30\times10^4$ mg/L.

7. The method of claim 3, wherein based on 100 parts by weight of the dispensing water, the modified nano graphite and polyacrylamide composite material is 0.3 to 0.6 parts by weight, the phenolic crosslinking agent is 0.1 to 0.5 parts by weight, and the aldehyde crosslinking agent is 0.2 to 0.6 parts by weight.

8. The method of claim 3, wherein
in step (F1), the dissolving comprises conditions of dissolution including a temperature of 15-25° C., and a time of 120-240 min; and
in the step (F2), the contacting comprises conditions including a temperature of 20-40° C., and a time of 10-90 min, and the standing comprises conditions including a temperature of 80-200° C., and a time of 6-72 h.

9. The method of claim 3, wherein the method for preparing the modified nano graphite and polyacrylamide composite material including: in a redox initiation system, contacting the modified nano graphite with the structure shown in the formula (3) with acrylamide monomer to perform polymerization reaction to obtain a modified nano graphite and polyacrylamide composite material shown in the formula (2)

formula (2)

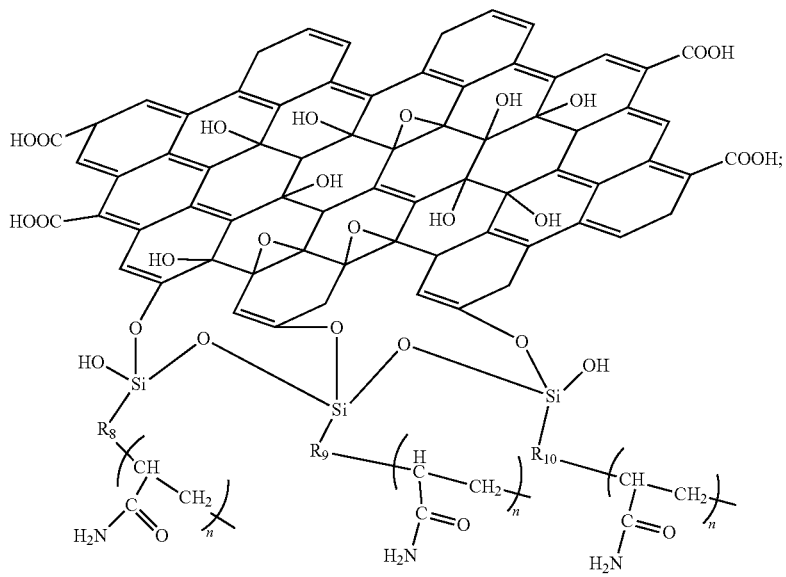

formula (3)

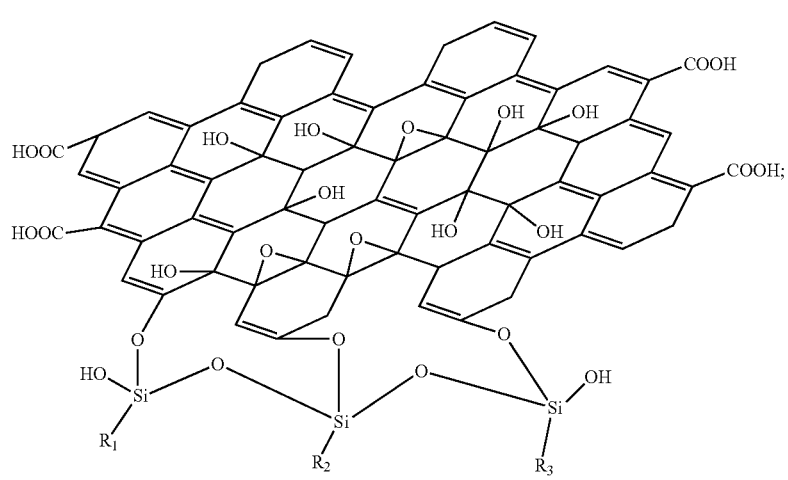

wherein $R_1$, $R_2$ and $R_3$ are vinyl or propenyl;

formula (2)

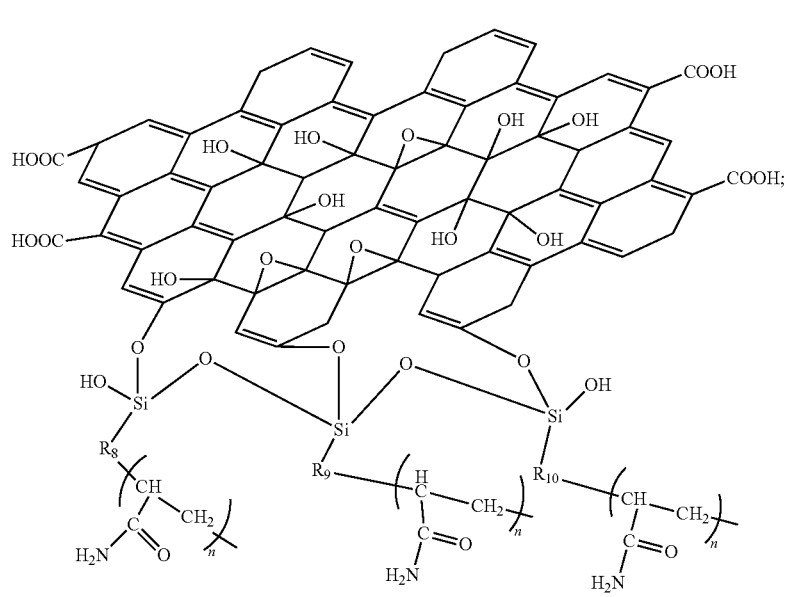

wherein $R_8$, $R_9$ and $R_{10}$ are derived from vinyl or propenyl;
wherein is an integer of 1200-3200, and n is an integer of 2400-6400;
wherein the weight average molecular weight of the composite material is $400\text{-}1000\times10^4$.

10. The method of claim 9, wherein $R_1$, $R_2$ and $R_3$ are vinyl.

11. The method of claim 10, wherein the redox initiation system comprises reducing agent and oxidizing agent, wherein the reducing agent is one or more selected from the group consisting of sodium bisulfite, sodium sulfite and ferrous ions; the oxidizing agent is one or more selected from the group consisting of ammonium persulfate, potassium persulfate and sodium persulfate.

12. The method of claim 11, wherein based on 100 parts by weight of deionized water, the reducing agent is 0.05 to 0.3 parts by weight, the oxidizing agent is 0.05 to 0.3 parts by weight, the modified nano graphite with the structure shown in the formula (3) is 0.01 to 0.05 parts by weight, and the acrylamide monomer is 20 to 30 parts by weight.

13. The method of claim 9, wherein the polymerization reaction conditions comprise a temperature of 30-40° C. and a time of 2-5 h.

14. The method of claim 9, wherein the modified nano graphite having the structure represented by formula (3) is prepared by a method comprising:
(a) dispersing a monomer shown in a formula (4) in deionized water to obtain dispersion liquid;
(b) contacting the dispersion liquid with monomer shown in a formula (5) to obtain modified nano graphite solution;
(c) washing and drying the modified nano graphite solution to obtain a drying products, then grinding and dispersing the drying products to obtain modified nano graphite;

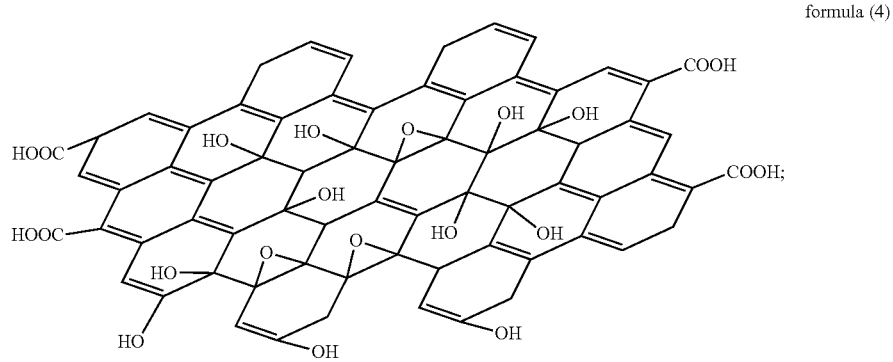

formula (4)

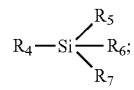

formula (5)

wherein $R_4$ is vinyl or propenyl, respectivly;

wherein $R_5$, $R_6$ and $R_7$ are methoxy, ethoxy or β-methoxyethoxy, respectivly.

15. The method of claim 14, wherein $R_4$ is vinyl.

16. The method of claim 14, wherein the monomer shown in the formula (5) is one or more selected from the group consisting of vinyl triethoxysilane, vinyl trimethoxysilane or vinyl tris (β-methoxyethoxy) silane.

17. The method of claim 14, wherein the weight ratio of the monomer shown in the formula (4), the monomer shown in the formula (5) and the deionized water is (1-2.5):(0.1-0.25):100.

18. The method of claim 14, wherein in step (a), the dispersing is ultrasonic dispersion and comprises conditions including stirring at 400-800 rpm, ultrasonic power of 300-800 W, a temperature of 15-25° C., and a time of 1-6 h;

in step (b), the contacting comprises conditions including stirring at a speed of 400-800 rpm, a temperature of 60-80° C., and a time of 6-8 h;

in step (c), the washing comprises washing with a mixed solution of deionized water and ethanol, and the drying comprises conditions including a temperature of 35-50° C.

19. The method of claim 14, wherein the volume ratio of the deionized water to the ethanol in the mixed solution is 1:(1-1.5).

20. A method of using a composite temperature resistance gel plugging agent in profile control and water shutoff of ultra-deep reservoirs, wherein the method comprises placing the composite temperature resistance gel plugging agent of claim 1 into an ultra-deep reservoir.

\* \* \* \* \*